United States Patent [19]

Parker

[11] Patent Number: 5,110,772
[45] Date of Patent: May 5, 1992

[54] FABRICATION OF DENSE $Si_3N_4$ CERAMICSS USING $CAO$-$TIO_2$-$SIO_2$ ADDITIVES

[75] Inventor: Frederick J. Parker, Columbia, Md.

[73] Assignee: W. R. Grace & Co.-Conn., New York, N.Y.

[21] Appl. No.: 575,102

[22] Filed: Aug. 30, 1990

[51] Int. Cl.$^5$ .............................................. C04B 35/48
[52] U.S. Cl. ........................................ 501/97; 501/96; 501/123; 501/133; 501/135; 264/65; 264/66; 423/344; 423/353
[58] Field of Search ................... 501/96, 97, 98, 123, 501/133, 135; 264/65, 66; 423/344, 353

[56] References Cited

U.S. PATENT DOCUMENTS

| | | | |
|---|---|---|---|
| 4,102,698 | 7/1978 | Lange et al. | 106/65 |
| 4,407,971 | 10/1983 | Komatsu et al. | 501/97 |
| 4,542,109 | 9/1985 | Pasto | 501/95 |
| 4,591,537 | 5/1986 | Aldinger et al. | 428/698 |
| 4,764,490 | 8/1988 | Yamakawa et al. | 501/97 |

FOREIGN PATENT DOCUMENTS 63-151679 6/1988 Japan .
63-151681 6/1988 Japan .
1536290 2/1976 United Kingdom .

OTHER PUBLICATIONS

N. Iwamoto et al., "Silicon Nitride Joining with Glass Solder in the System $CaO$-$SiO_2$-$TiO_2$", Yogyo-Kyokai-Shi 94, pp. 880-886, Welding Research Institute.

N. Iwamoto et al., "Silicon Nitride Joining with Silicate Glass Solder (I)", Welding Research Institute of Osaka University.

*Primary Examiner*—Mark L. Bell
*Assistant Examiner*—Alan Wright
*Attorney, Agent, or Firm*—Steven Capella

[57] ABSTRACT

Ternary $CaO$-$TiO_2$-$SiO_2$ compositions are discussed. These compositions are useful as sintering aids for silicon nitride sintering. Use of these ternary compositions allows silicon nitride to be effectively sintered at lower temperatures than when conventional yttria sintering aids are used.

12 Claims, 1 Drawing Sheet

FABRICATION OF DENSE $Si_3N_4$ CERAMICSS USING $CAO-TIO_2-SIO_2$ ADDITIVES

FIELD OF THE INVENTION

This invention relates to the use of $CaO-SiO_2-TiO_2$ additives to promote the sintering of $Si_3N_4$ powders into dense ceramics with good mechanical properties.

BACKGROUND OF THE INVENTION

Silicon nitride, $Si_3N_4$, is recognized as a candidate material for high temperature-high performance applications which require the benefits of a ceramic material. Considerable attention has been paid to the preparation of $Si_3N_4$ powders and sintering aids.

The covalent nature of $Si_3N_4$ makes it very difficult to sinter and densify. Sintering aids are therefore utilized to prepare dense ceramic bodies. Sintering aids form a liquid phase at high temperatures and act as a medium for sintering $Si_3N_4$ via a dissolution-precipitation process. The viscosity and melting point of the liquid phase must be suitable to allow sintering of $Si_3N_4$ to occur. The resultant microstructure generally contains intergrown $Si_3N_4$ crystals or grains, with glassy and/or crystalline phases located along grain boundaries and at grain junctions, which phases solidified from the liquid sintering phase. The grain boundary phase(s) are most commonly oxide, silicate or oxynitride compositions.

There is a great deal of literature and patent documentation on oxide and non-oxide additives capable of sintering $Si_3N_4$. For example, U.S. Pat. No. 4,102,698 discloses the use of $Y_2O_3$ and $SiO_2$ to form $Si_3N_4$ ceramics with good strength and oxidation resistance.

Japanese Application 86/297535 discloses the use of magnesium silicates with $ZrO_2$ to sinter $Si_3N_4$ at 1700° C. Japanese Application 88/151679 utilizes $MgAl_2O_4$ (magnesium aluminate) as a sintering aid for $Si_3N_4$. The use of alkaline earth oxides or $MgAl_2O_4$ to sinter $Si_3N_4$ is disclosed in British Patent 1536290. Ceramic composites of $Si_3N_4$ with oxides, such as cordierite ($Mg_2Al_5Si_5O_{18}$), are claimed in U.S. Pat. No. 4,542,109.

The use of $CaO-TiO_2-SiO_2$ glass solder for joining is discussed in two articles by N. Iwamoto, U. Norimasa and Y. Haibara; Trans. JWRI, 15(2), 265-71, (1986) and N. Iwamoto, U. Norimasa and Y. Haibara; J. Car. Soc. Japan, 94(8), 880-86, (1986). The resultant Ti nitride bond strongly secured two $Si_3N_4$ pieces previously sintered using $Y_2O_3-Al_2O_3$ additives.

$Y_2O_3$-containing sintering aids e.g., $Y_2O_3-Al_2O_3$ and $Y_2O_3-Al_2O_3-SiO_2$, give good mechanical properties for ambient and elevated temperature applications, as well as high temperature oxidation resistance. However, yttria is expensive and yttria-containing aids generally require temperatures of at least 1700°-1750° C. to form dense $Si_3N_4$ ceramics. Thus, there remains a need for less expensive, yet effective sintering aids for $Si_3N_4$. Additionally, there is a need for a sintering aid which allows for extensive densification at lower sintering temperatures.

SUMMARY OF THE INVENTION

The present invention overcomes the disadvantages of the various known $Si_3N_4$ sintering aids and processes for sintering $Si_3N_4$. The invention achieves this result by utilizing a sintering aid containing or decomposing to form a mixture containing $CaO$, $TiO_2$ and $SiO_2$.

One aspect of the invention embraces a method for producing sintered silicon nitride bodies comprising:
a) combining sources of $CaO$, $TiO_2$ and $SiO_2$ with silicon nitride powder to form a mixture,
b) forming the mixture into a shape, and
c) sintering the shape to produce a dense silicon nitride body.

In a further aspect, the invention encompasses methods using a sintering aid having an effective oxide composition falling in the region defined by composition points:
A. 35 $CaO$—25 $TiO_2$—40 $SiO_2$
B. 25 $CaO$—35 $TiO_2$—40 $SiO_2$
C. 25 $CaO$—55 $TiO_2$—20 $SiO_2$
D. 35 $CaO$—50 $TiO_2$—15 $SiO_2$
on a ternary $CaO-TiO_2-SiO_2$ composition diagram where the proportions are in wt. % and boundaries connecting points A, B, C, and D are included in the region.

In a further aspect, the invention encompasses sintered $Si_3N_4$ compositions which contain the $CaO-TiO_2-SiO_2$ sintering aid described above. Such sintered compositions preferably contain about 2-15 wt. % of such sintering aid, but more preferably about 7-10 wt. %. In a more particular aspect, the sintered composition may consist essentially of $Si_3N_4$ grains and grain boundary phase(s) consisting essentially of $CaO$, $TiO_2$ and $SiO_2$ and/or compounds thereof. The invention is not limited to any specific phase in the silicon nitride powder used or in the sintered product produced. Thus, the invention encompasses the presence of one or more of $\alpha$, $\beta$, and amorphous $Si_3N_4$ phases in the unsintered $Si_3N_4$ powder and the sintered product.

The invention is further directed to sintering aid compositions containing $CaO$, $TiO_2$ and $SiO_2$ or compounds decomposing to form those oxides. The sintering aid compositions preferably fall in the range described by points A, B, C, and D above. The compound titanite (or sphene) $CaTiSiO_5$ lies in this region. Applicant does not claim to have invented titanite although applicant's invention encompasses a new use for that compound.

These and other aspects of the invention will be discussed further below.

DETAILED DESCRIPTION

Figure 1:
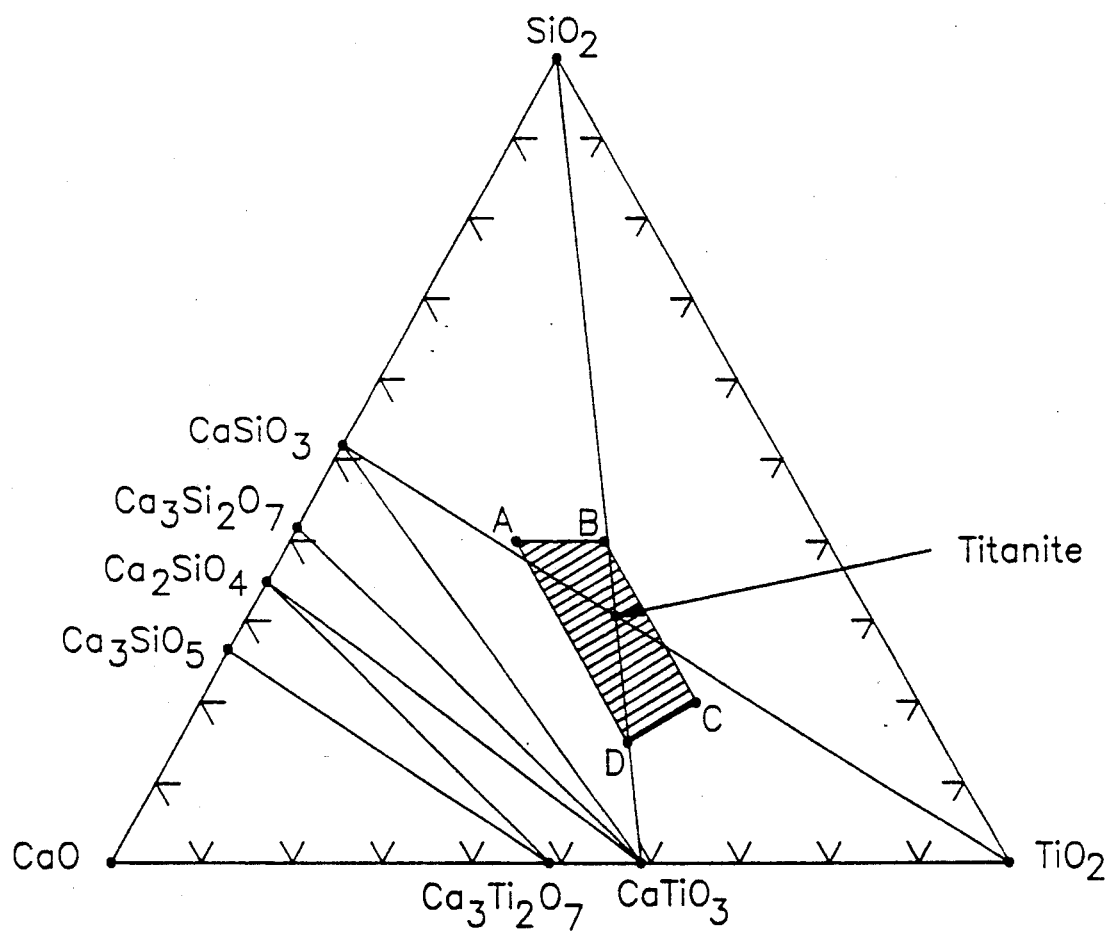
FIG. 1 is a $CaO-TiO_2-SiO_2$ ternary composition diagram in wt. % showing sintering aid compositions of the invention.

This patent discloses the use of ternary compositions in the $CaO-TiO_2-SiO_2$ system as sintering aids to form dense $Si_3N_4$ ceramics. Compositions found to be useful for this purpose are within the region A-B-C-D in FIG. 1. All compositions within this region have melting points of approximately 1400° C. or less. Within the region lies the compound $CaTiSiO_5$, which is the naturally occurring mineral titanite (also called "sphene"). X-ray diffraction study has shown that calcium-rich compositions outside this region are very rich in $CaSiO_3$, which can degrade the $Si_3N_4$. The presence of excessive $SiO_2$ or $TiO_2$ will also result in products with inferior properties or high porosities. Those additives comprising primarily the titanate phase were found to be most effective in sintering $Si_3N_4$. The region A-B-C-

D shown in FIG. 1 is bordered by the four compositions (in wt. %),

A—35 CaO—25 TiO$_2$—40 SiO$_2$
B—25 CaO—35 TiO$_2$—40 SiO$_2$
C—25 CaO—55 TiO$_2$—20 SiO$_2$
D—35 CaO—50 TiO$_2$—15 SiO$_2$

The sintering aid compositions may be added to Si$_3$N$_4$ powders by milling or other means to achieve intimate mixing. While the invention encompasses the use of any effective proportion of sintering aid, the overall sintered composition preferably contains about 2 to 15 wt. % of sintering aid in the form of intergranular material. More preferably, this intergranular material forms about 7 to 10 wt. % of the sintered composition. Binders, plasticizers or other forming aids commonly used in ceramic processing may be added. The powder is then formed into a shape by methods known to those skilled in the art, including hot-pressing. The powder is heated to temperatures of at least 1600° C. for a period of time which permits the sintering process described above.

Hot-pressing of compositions within the region A-B-C-D successfully produced dense bodies even at 1675° C. with good properties, while the process of the invention can be carried out by hot pressing at as low as 1600° C. Hot-pressing at temperatures of 1675° C. gives products at least 95% theoretically dense (typically, 96-98%) having high microhardness values and mechanical strengths of 90 Kpsi and greater. Such properties are useful for wear and other low-moderate temperature applications. Hot-pressing was used to achieve these properties since it is less sensitive to processing parameters than other sintering techniques and provides a better gauge of materials performance. Excellent properties would be expected from other fabrication methods utilized by those skilled in the art.

Modulus of rupture strengths averaged 90-100 Kpsi. Vickers microhardness measurements were excellent, with values to nearly 2000 kg/mm$^2$. Such properties are consistent with those required for low to moderate temperature wear and bearing applications.

X-ray diffraction was used to characterize the phases formed by sintering Si$_3$N$_4$ with the CaO—TiO$_2$—SiO$_2$ additives. The primary crystalline phase was high-temperature $\beta$—Si$_3$N$_4$. Residual $\alpha$—Si$_3$N$_4$ was also present, which had not converted to the $\beta$-form. A minor crystalline oxynitride phase (Si$_2$N$_2$O according to x-ray diffraction) was observed. No other crystalline phases were detected. This suggests the CaO—TiO$_2$—SiO$_2$ is present as a glass phase. If desired, part or all of this phase could probably be annealed to form crystalline phases such as titanite.

Scanning electron microscopy was used to determine the microstructure of several compositions of the invention. The simultaneous use of Energy Dispersive Analytical X-Ray (EDAX) techniques gave insight into the microchemistry. In general, the microstructure consisted of intergrown Si$_3$N$_4$ particles. Along grain boundaries, or between clusters of intergrown grains, was a very fine-grained material. There were also random, isolated grains whose composition was primarily believed to be excess TiO$_2$. The groundmass of the grain boundary phase contained Si, Ca and some Ti by EDAX. As the EDAX system used could not discern oxygen or nitrogen, the groundmass is thought to comprise at least one silicon oxy-nitride (as detected by x-ray diffraction) along with a calcium-bearing glass. Etching of polished sections by 5% aqueous HF at 22° C. for 3 minutes showed some preferential etching at grain boundaries. This further suggests at least two phases are present in the grain boundary groundmass.

The additions of CaO—TiO$_2$—SiO$_2$ within the claimed compositional ranges were accomplished using the appropriate oxides. However, it is recognized that the same sintered product can be produced by those skilled in the art using other sources of the additives. These may be pre-reacted CaO—TiO$_2$—SiO$_2$ mixtures, or mixtures of other precursors such as carbonates, acetates, hydroxides, etc., which form the desired oxides upon decomposition. Other powder forming techniques, e.g. sol-gel or other precipitation methods, could also be employed to produce a homogenous dispersion of the additives in the Si$_3$N$_4$.

Having described the basic aspects of the invention, the following examples are given to illustrate specific embodiments thereof.

EXAMPLES

Several compositions, as shown in Table 1, were prepared under identical conditions to illustrate the useful properties of the claimed compositions. The appropriate amounts of Baker Reagent Grade CaO, Ppg Hysil 233 SiO$_2$, and TAM Rutile TiO$_2$ were weighed out, as follows:

TABLE 1

| Additive Composition | Components, gms | | |
|---|---|---|---|
| (in wt. %) | CaO | TiO$_2$ | SiO$_2$ |
| 35 CaO—25TiO$_2$—40SiO$_2$ | 3.5 | 2.5 | 4.0 |
| 35 CaO—50TiO$_2$—15SiO$_2$ | 3.5 | 5.0 | 1.5 |
| 29 CaO—40TiO$_2$—31SiO$_2$ | 12.6 | 9.0 | 14.4 |

Mixtures of dry powders were homogenized for 0.5 hour in a Spex Mill (Spex Industries, Metuchen, N.J.), using an Al$_2$O$_3$ jar with Al$_2$O$_3$ milling balls. Then, the intimately mixed powders were mixed with Si$_3$N$_4$ powder (SNE-10, Ube Industries, Japan) and milling aids as shown below:

| Additive Composition | Additives gms | Si$_3$N$_4$ gms | Thixcin gms | Carbowax gms |
|---|---|---|---|---|
| 35 CaO—25TiO$_2$—40SiO$_2$ | 16.0 | 144 | 1.8 | 1.8 |
| 35 CaO—50TiO$_2$—15SiO$_2$ | 8.0 | 72 | 0.9 | 0.9 |
| 29 CaO—40TiO$_2$—31SiO$_2$ | 8.0 | 72 | 0.9 | 0.9 |

The above powder mixtures were separately dry-ball milled in Al$_2$O$_3$ jars with 99% Al$_2$O$_3$ grinding media for 16 hours. The products were sieved through at least a 100 mesh screen to remove coarse agglomerates. Powders were poured into 3" diameter graphite dies and hot-pressed into pellets, as follows:

Heat up at 25°/min to 1225° C., pressure applied,
Heat up at 5.4°/min to 1676° C.,
Hold up at 1676° C./3 Kpsi pressure for 75 minutes.
Slow cooldown.

Each pellet was then removed from the die, sandblasted to remove adhered carbon from the dies, and cut/ground to form appropriate samples for testing. Mechanical test bars 0.1×0.2×2 inch in length were cut and machined using a 240 grit wheel.

Modulus of rupture or bend strength tests were performed on Instron Model 4201 unit, using a 3-point bend fixture. Hardness values were determined using a Leco M-400 Microhardness Testor with a Vickers Indicator, 500 gm. load and 10-second indent time. SEM-/EDAX work was performed on a Hitachi S570 Instrument with Kevex EDAX analyzer. X-ray diffraction was done on a Philips Electronics ADP 3600-02 automated diffractometer on powders mounted in trays. CuKα radiation was used, and resultant patterns were compared to standards published by JCPDS. Bulk densities were determined on dry blocks using the Archimedes method.

The properties determined for the three compositions are shown in Table 2. Phase analysis by x-ray diffraction, microstructure, and microchemistry are consistent with the descriptions given earlier. It is evident that the additives described have demonstrated their ability to form $Si_3N_4$ powders into dense ceramics with good strengths and microhardness values.

TABLE 2

Properties of $CaO-TiO_2-SiO_2$ Compositions

| Additive Composition | Bulk Density g/cc | Theor. Density % | Vickers Microhardness (500 g. load) kg/mm² | MOR, Kpsi |
|---|---|---|---|---|
| 35 $CaO-25TiO_2-40SiO_2$ | 3.11 | 97.2 | 1978 | 89.1 |
| 35 $CaO-50TiO_2-15SiO_2$ | 3.06 | 95.6 | 1693 | 92.9 |
| 29 $CaO-40TiO_2-31SiO_2$ | 3.10 | 96.9 | 1945 | 99.6 |

It is understood that the foregoing detailed description is given merely by way of illustration and that many variations may be made therein without departing from the spirit of this invention.

What is claimed is:

1. A sintered silicon nitride composition comprising silicon nitride and intergranular material consisting essentially of $CaO$, $TiO_2$, and $SiO_2$ in relative proportions falling in a region defined by composition points
   A. 35 $CaO-25$ $TiO_2-40$ $SiO_2$,
   B. 25 $CaO-35$ $TiO_2-40$ $SiO_2$,
   C. 25 $CaO-55$ $TiO_2-20$ $SiO_2$, and
   D. 35 $CaO-50$ $TiO_2-15$ $SiO_2$
on a ternary $CaO-TiO_2-SiO_2$ composition diagram having proportions as wt. %, said region including points ABCD and the lines connecting said points, said intergranular material forming about 2-15 wt. % of said composition.

2. The sintered composition of claim 1 wherein said intergranular material forms about 7-10 wt. % of the composition.

3. The sintered composition of claim 1 having a density of about 95% or greater of its theoretical density.

4. The sintered composition of claim 3 having a density of about 96% or greater of its theoretical density.

5. The sintered composition of claim 1 having a mechanical strength greater than or equal to about 90 Ksi.

6. A method for producing sintered silicon nitride bodies comprising:
   a) combining sources of $CaO$, $TiO_2$ and $SiO_2$ with silicon nitride powder to form a mixture, wherein
      i) said sources are combined in amounts adequate to form, in said sintered body, a $CaO-TiO_2-SiO_2$ composition falling in the area described by points ABCD in FIG. 1, and
      ii) said sources are combined in amounts such that said $CaO-TiO_2-SiO_2$ composition forms about 2-15 wt. % of said sintered body,
   b) forming the mixture into a shape, and
   c) sintering the shape to produce a dense silicon nitride body.

7. The method of claim 6 wherein said combining comprises milling said sources and $Si_3N_4$ powder.

8. The method of claim 6 wherein said mixture is combined with at least one material selected from the group consisting of binders, plasticizers and other forming aids prior to said forming step b).

9. The method of claim 6 wherein said forming step b) is conducted by extruding or pressing said mixture.

10. The method of claim 9 wherein said sintering is conducted by hot pressing said shape.

11. The method of claim 6 wherein said sources are selected from the group consisting of oxides, carbonates, acetates and hydroxides.

12. A composition effective as a sintering aid for silicon nitride said composition consisting essentially of $CaO$, $TiO_2$ and $SiO_2$ in relative proportions falling in a region defined by composition points
   A. 35 $CaO-25$ $TiO_2-40$ $SiO_2$,
   B. 25 $CaO-35$ $TiO_2-40$ $SiO_2$,
   C. 25 $CaO-55$ $TiO_2-20$ $SiO_2$, and
   D. 35 $CaO-50$ $TiO_2-15$ $SiO_2$
on a ternary $CaO-TiO_2-SiO_2$ composition diagram having proportions as wt. %, said region including points ABCD and the lines connecting said points, but excluding the composition point of titanite ($CaO.TiO_2.SiO_2$).

* * * * *